(12) United States Patent  
Yoon et al.

(10) Patent No.: US 8,295,195 B2
(45) Date of Patent: Oct. 23, 2012

(54) APPARATUS AND METHOD FOR DISCRIMINATING FRAME FORMAT IN WIRELESS COMMUNICATION SYSTEM

(75) Inventors: Chanho Yoon, Daejeon (KR); Il-Gu Lee, Seoul (KR); Jung-Bo Son, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 405 days.

(21) Appl. No.: 12/642,167

(22) Filed: Dec. 18, 2009

(65) Prior Publication Data

US 2010/0157832 A1 Jun. 24, 2010

(30) Foreign Application Priority Data

Dec. 19, 2008 (KR) .................. 10-2008-0130498

(51) Int. Cl.
*H04L 12/26* (2006.01)
*H04J 3/16* (2006.01)

(52) U.S. Cl. ........................................ 370/252; 370/466
(58) Field of Classification Search ........... 370/252.338, 370/465, 466
See application file for complete search history.

(56) References Cited

U.S. PATENT DOCUMENTS

| | | | |
|---|---|---|---|
| 2003/0091132 A1* | 5/2003 | Anderson | 375/345 |
| 2005/0057950 A1* | 3/2005 | Colby et al. | 363/74 |
| 2007/0047666 A1 | 3/2007 | Trachewsky | |
| 2007/0178928 A1* | 8/2007 | Ode | 455/522 |
| 2011/0124298 A1* | 5/2011 | Ode | 455/69 |

* cited by examiner

*Primary Examiner* — Andrew Lee
(74) *Attorney, Agent, or Firm* — Staas & Halsey LLP

(57) ABSTRACT

A frame format discrimination method in a wireless communication system is provided. The frame format discrimination method includes: calculating a power of an in-phase signal and a power of a quadrature signal in a predetermined section of a frame; comparing the power of the in-phase signal with the power of the quadrature signal; and determining the format of the frame in accordance with the comparison result.

16 Claims, 8 Drawing Sheets

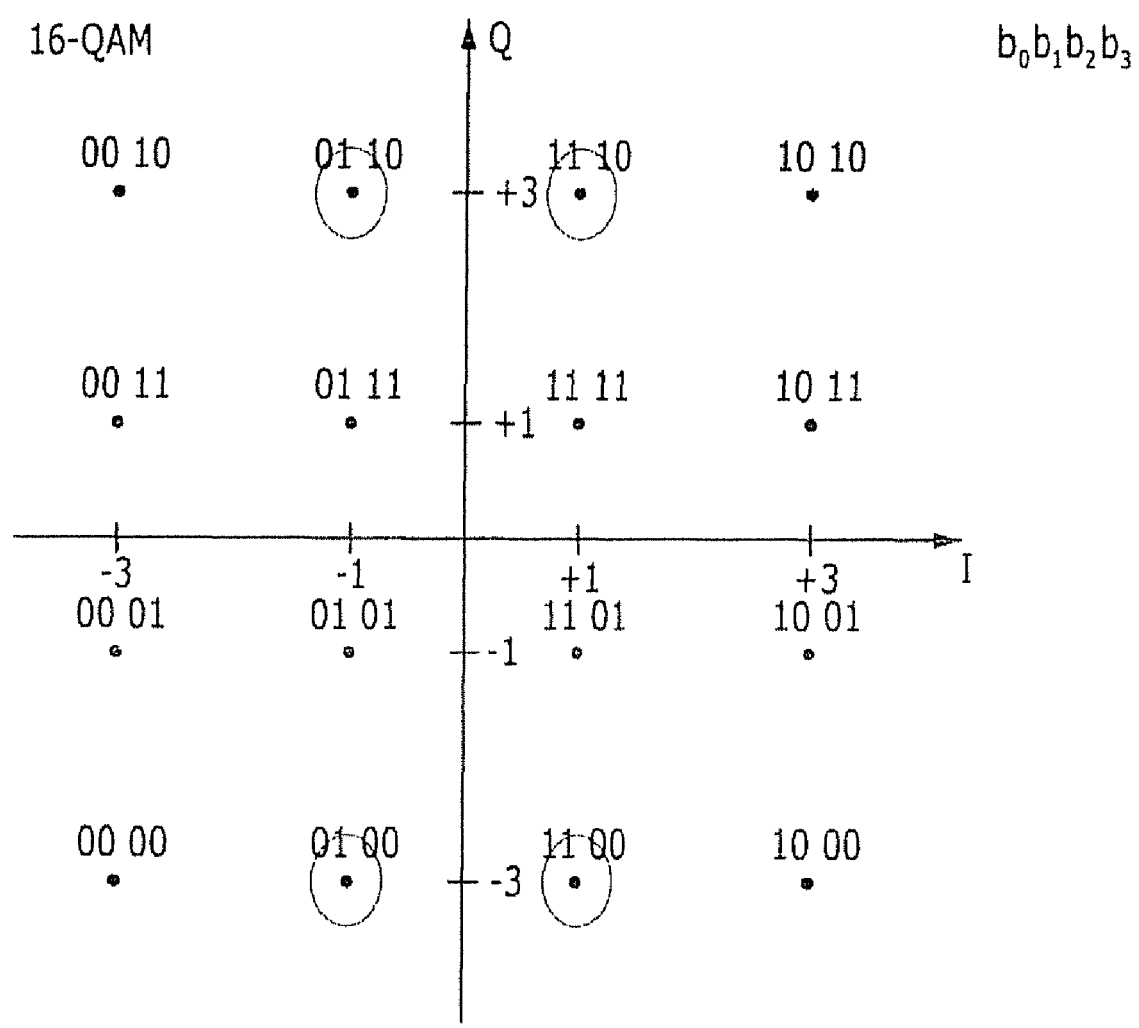

APPARATUS AND METHOD FOR DISCRIMINATING FRAME FORMAT IN WIRELESS COMMUNICATION SYSTEM

CROSS-REFERENCE(S) TO RELATED APPLICATIONS

The present application claims priority of Korean Patent Application No. 10-2008-0130498, filed on Dec. 19, 2008, which is incorporated herein by reference in its entirety.

BACKGROUND OF THE INVENTION

1. Field of the Invention

Exemplary embodiments of the present invention relates to a wireless communication system; and, more particularly, to a frame format discrimination apparatus and method in a wireless communication system.

2. Description of Related Art

In general, a wireless communication system uses a standardized frame format. When various frame formats are used together in a wireless communication system, it is necessary to discriminate the frame formats. However, standards or methods for discriminating frame formats are not much known. Furthermore, although a standard or method is known, the discrimination precision thereof is low.

For example, the Institute of Electrical and Electronic Engineers (IEEE) 802.11n standard which has been recently defined may be used together with the existing IEEE 802.11a or 802.11g standard. The frame format of the IEEE 802.11n standard includes a similar section to the frame format of the existing standard and a new section, in order to maintain the compatibility with the existing standard. In the frame format of the IEEE 802.11n standard, the new section includes a High Throughput (HT) field. Therefore, discriminating a HT field in a frame makes it possible to determine whether or not the frame format corresponds to the IEEE 802.11n standard. However, a conventional HT-field discrimination method has a disadvantage in that its reliability decreases in a state where a signal to noise ratio (SNR) is high.

SUMMARY OF THE INVENTION

An embodiment of the present invention is directed to an apparatus and method which discriminates the format of a frame with high precision in a wireless communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

An embodiment of the present invention is directed to a method for discriminating a format discrimination in a wireless communication system includes: calculating a power of an in-phase signal and a power of a quadrature signal in a predetermined section of a frame; comparing the power of the in-phase signal with the power of the quadrature signal; and determining the format of the frame in accordance with the comparison result.

Another embodiment of the present invention is directed to an apparatus for discriminating a frame format in a wireless communication system, including: a power calculation unit configured to calculate a power of an in-phase signal and a power of a quadrature signal in a predetermined section of a frame; a power comparison unit configured to compare the power of the in-phase signal with the power of the quadrature signal; and a format determination unit configured to determine the format of the frame in accordance with the comparison result

BRIEF DESCRIPTION OF THE DRAWINGS

FIG. 8C is a constellation diagram illustrating a 16 Quadrature Amplitude Modulation (16-QAM) scheme.

DESCRIPTION OF SPECIFIC EMBODIMENTS

Figure 1:
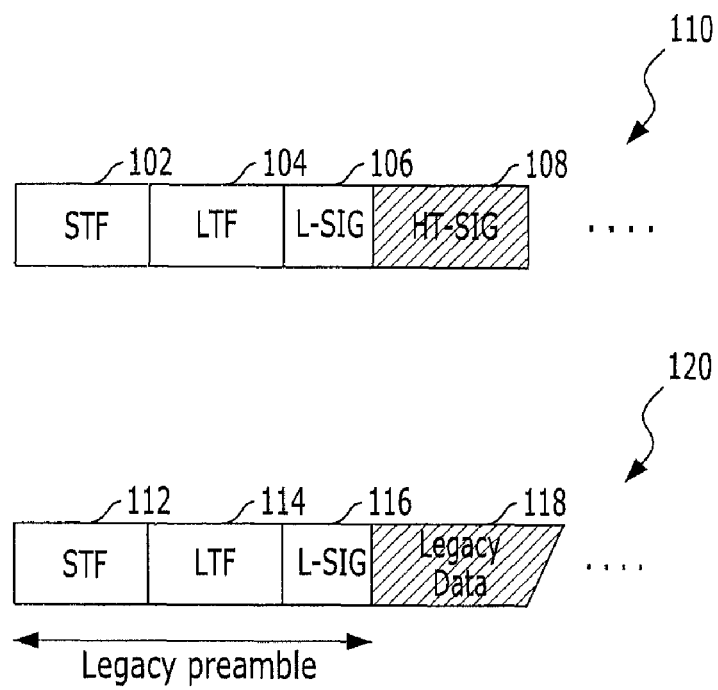
FIG. 1 illustrates the structures of an IEEE 802.11n frame format 110 and an IEEE 802.11a frame format 120.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

The following descriptions will exemplify the principle of the present invention. Therefore, although not described and illustrated clearly in this specification, the principle of the present invention may be embodied and various apparatuses included in the concept and scope of the present invention may be invented by those skilled in the art. Conditional terms and embodiments enumerated in this specification are clearly intended only to make the concept of the present invention understood. Furthermore, it should be understood that the present invention is not limited to the enumerated embodiments and states.

Furthermore, it should be understood that all detailed descriptions in which specific embodiments as well as the principle, viewpoint, and embodiments of the present invention are enumerated are intended to include structural and functional equivalents. Furthermore, it should be understood that such equivalents include all elements which are developed to perform the same function as equivalents to be invented in the future as well as currently-known equivalents, that is, regardless of the structure.

Therefore, it should be understood that block diagrams of this specification illustrate the conceptual viewpoint of exemplary circuits for embodying the principle of the present invention. Similarly, it should be understood that flowcharts, state transition diagrams, pseudo codes and so on can be embodied as computer readable codes on a computer readable recording mediums, and illustrate various processes which are performed by a computer or processor regardless of whether the computer or processor is clearly illustrated or not.

The functions of various elements illustrated in diagrams including processors or functional blocks indicated by a similar concept to the processors may be provided by the use of hardware having an ability of executing suitable software as well as dedicated hardware. When provided by processors, the functions may be provided by a single dedicated processor, a single common processor, or a plurality of individual processors. Some of the plurality of individual processors may be shared.

The use of processors, control, or terms presented as a similar concept to the processors or the control should not be analyzed by exclusively citing hardware having an ability of executing software. It should be understood that digital signal processor (DSP) hardware, ROM, RAM, and non-volatile memory for storing software are suggestively included without a limitation. Well-known other hardware may be included.

In the claims of this specification, it is intended that a component expressed as means for performing a function described in the detailed descriptions include combinations of circuit elements performing the function or methods of performing a function including all forms of software containing firmware and micro codes. The component is coupled to a proper circuit for executing the software to perform the function. In the present invention defined by such claims, functions provided by means enumerated in various manners are combined, and the component is combined with methods required by the claims. Therefore, it should be understood that any means capable of providing the function is equivalent to that grasped from this specification.

The above-described purpose, feature, and advantage will be clarified by the following detailed descriptions which are related to the accompanying drawings. Accordingly, the technical spirit of the present invention can be easily embodied by those skilled in the art to which the present invention pertains. Furthermore, when it is determined that a specific description for a well-known technology related to the present invention may unnecessarily make the purport of the present invention ambiguous in the detailed descriptions of the present invention, the specific description will be omitted. Hereafter, exemplary embodiments of the present invention will be described in detail with reference to the accompanying drawings.

In embodiments of the present invention, the power of an in-phase signal is compared with the power of a quadrature signal, and the format of a frame is determined in accordance with the comparison result.

A frame format used in a wireless communication system may be configured in various manners. Depending on the type of the frame format, the quantity of in-phase signals included in the frame may differ from the quantity of quadrature signals included in the frame. For example, a frame in a format A may include a larger number of in-phase signals, and a frame in a format B may include a larger number of quadrature signals. In this case, when the power of the in-phase signals of the frame is compared with the power of the quadrature signals of the frame, it is possible to determine whether the frame format corresponds to the format A or the format B.

Hereafter, a case in which the frame format of the Institute of Electrical and Electronic Engineers (IEEE) standard 802.11a and the frame format of the IEEE 802.11n standard are discriminated will be described as an example.

FIG. 1 illustrates the structures of the IEEE 802.11n frame format 110 and the IEEE 802.11a frame format 120. The IEEE 802.11n frame format 110 has been newly defined since the IEEE 802.11a frame format 120 was defined. The IEEE 802.11n frame format 110 includes the same section as the existing frame format and a new section, in order to maintain the compatibility with the existing standard.

Referring to FIG. 1, the IEEE 802.11n frame format 110 includes a short training field (STF) 102, a long training field (LTF) 104, and a legacy-signal (L-SIG) field 106 which are identical to an STF 112, an LTF 114, and an L-SIG field 116 of the IEEE 802.11a frame format 120, respectively. Accordingly, a wireless communication system may maintain the compatibility between the frame formats of the two standards using the STF, the LTF, and the L-SIG field of the frame.

Meanwhile, the IEEE 802.11n frame format 110 includes a new section, compared with the existing frame format. In the IEEE 802.11n frame format 110, a high throughput signal (HT-SIG) field 108 is positioned next to the L-SIG field 106. In the IEEE 802.11a frame format 120, however, a Legacy Data field 118 is positioned next to the L-SIG field 116. Therefore, when a field positioned next to the L-SIG field is checked, it is possible to discriminate which standard the frame format corresponds to between the two standards.

In the HT-SIG field 108, the power of a quadrature signal is larger than in the Legacy Data field 118. Therefore, when the power of an in-phase signal is compared with the power of a quadrature signal in the section where the HT-SIG field 108 or the Legacy Data field 118 is positioned, it is possible to discriminate the standard of the frame format. The reason that the power of the quadrature signal is larger in the HT-SIG field 108 is that a Quadrature-Binary Phase Shift Key (Q-BPSK) modulation scheme is applied to the HT-SIG field 108. This will be described with reference to FIG. 2.

Figure 2:
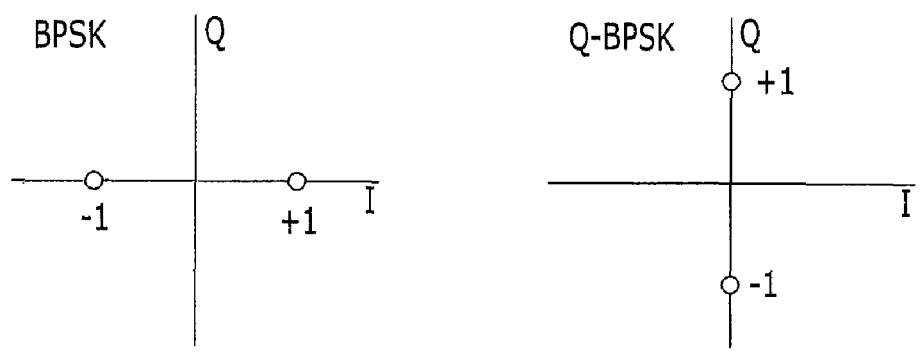
FIG. 2 is a constellation diagram illustrating a Binary Phase Shift Key (BPSK) modulation scheme and a Quadrature-Binary Phase Shift Key (Q-BPSK) modulation scheme.

FIG. 2 is a constellation diagram illustrating a BPSK modulation scheme and the Q-BPSK modulation scheme. The constellation diagram illustrates complex signals through an orthogonal coordinate expressed by a real axis and an imaginary axis. In this case, the real axis may be expressed as an in-phase (I) axis, and the imaginary axis may be expressed as a quadrature (Q) axis.

Basically, a Phase Shift Key (PSK) modulation scheme is a technique in which a signal is modulated with a predetermined phase difference set of a carrier wave.

In the BPSK modulation scheme, a signal is modulated with a phase difference of 180 degrees set in a carrier wave in accordance with a binary signal. Referring to FIG. 2, since the carrier wave of a symbol is positioned at +1 and −1 on the I axis, the signal is modulated by the carrier wave having a phase of 0 or 180 degrees.

In the Q-BPSK modulation scheme, a phase difference of 180 degrees is set in a carrier wave, similar to the BPSK modulation scheme. In the Q-BPSK modulation scheme, however, a 90-degree rotated carrier wave is used, unlike the BPSK modulation scheme. Referring to FIG. 2, since a carrier wave of a symbol is positioned at +1 or −1 on the Q axis, a signal is modulated by the carrier wave having a phase of 90 or 270 degrees.

Therefore, in the HT-SIG field 108 to which the Q-BPSK modulation scheme is applied, the power of the quadrature signal becomes larger than in a field to which a different modulation scheme is applied.

That is, in the wireless communication system in which the IEEE 802.11a standard and the IEEE 802.11n standard are used together, the power of an in-phase signal may be compared with the power of a quadrature signal in a section positioned next to an L-SIG field of a frame. Then, it is possible to discriminate the standard of the frame format.

<Frame Format Discrimination Method>

Hereafter, a frame format discrimination method in a wireless communication system in accordance with an embodiment of the present invention will be described.

Figure 3:
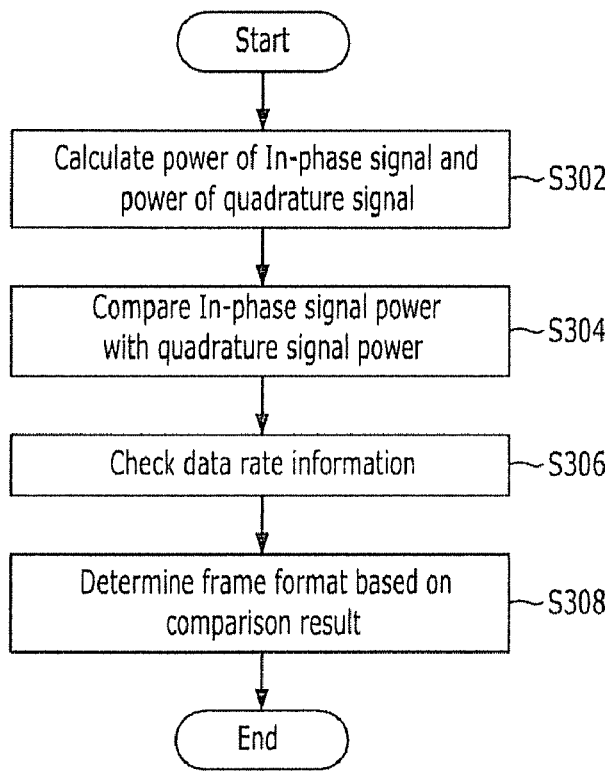
FIG. 3 is a flowchart explaining a frame format discrimination method in accordance with an embodiment of the present invention.

FIG. 3 is a flowchart explaining a frame format discrimination method in accordance with an embodiment of the present invention. Referring to FIG. 3, the frame format discrimination method in accordance with the embodiment of the present invention includes a step S302 of calculating the powers of an in-phase signal and a quadrature signal in a preset section of a frame, a step S304 of comparing the power of the in-phase signal with the power of the quadrature signal, and a step S308 of determining the format of the frame in accordance with the comparison result.

The power of the in-phase signal may be calculated by summing the powers of in-phase signals for a plurality of subcarriers, and the power of the quadrature signal may be calculated by summing the powers of quadrature signals for the plurality of subcarriers. Meanwhile, the power of the in-phase signal may be calculated by averaging the powers of in-phase signals for a plurality of subcarriers, and the power of the quadrature signal may be calculated by averaging the powers of quadrature signals for the plurality of subcarriers.

Such a method may be applied to an Orthogonal Frequency Division Multiplexing (OFDM) wireless communication system or the like. The OFDM scheme is a technique which transmits a signal using a plurality of subcarriers. In the OFDM wireless communication system, the powers of in-phase signals for a plurality of subcarriers may be compared with the powers of quadrature signals for the plurality of subcarriers, which makes it possible to increase the reliability of the frame format discrimination. In a preset section, the powers of in-phase signals for a plurality of subcarriers and the powers of quadrature signals for the plurality of subcarriers, respectively, may be summed or averaged. At this time, the plurality of subcarriers may be all or some of multiple subcarriers used in the OFDM scheme. When all of the multiple subcarriers are used, the reliability may further increase. However, considering the delay of processing time or the like, only some of the multiple subcarriers may be used at such a level as to satisfy a desired reliability.

The comparison of the powers at the step S306 may be performed by reflecting a preset weighting factor into the power of the in-phase signal or the quadrature signal. In a wireless communication system, a frame is received through a wireless channel in various states. When the format of the frame received in such a manner is discriminated, an effect of a channel state or signal to noise ratio (SNR) may be reflected using the preset weighting factor. The weighting factor which is optimized depending on the channel state or SNR may increase the precision of the frame format discrimination.

Meanwhile, the frame format discrimination method in accordance with the embodiment of the present invention may further include a step S306 of checking data rate information included in the frame. At this time, the format of the frame may be determined in accordance with the comparison result of the step S304 and the data rate information. Furthermore, when it is checked that the data rate information indicates a preset data rate, the format of the frame may be determined in accordance with the comparison result of the step S304.

Such a process may be applied to a case in which a frame format may differ depending on data rate information included in a frame. For example, the IEEE 802.11a standard includes data rate information in a Signal field. In this case, the data rate information indicates a data rate of 6 Mbps or 54 Mbps. Meanwhile, the IEEE 802.11n standard includes data rate information in a Legacy Signal field. The data rate information is defined to indicate a data rate of 6 Mbps at all times. Therefore, when it is checked that data rate information indicates a data rate other than 6 Mbps, it may be determined that the frame does not correspond to the IEEE 802.11n standard. On the other hand, when it is checked that data rate information indicates a data rate of 6 Mbps, the frame format may be discriminated depending on the power comparison result between the in-phase signal and the quadrature signal.

Through the above-described method, the data rate information included in the Signal field of the IEEE 802.11a standard or the Legacy Signal field of the IEEE 802.11n standard may be checked so as to determine the frame format in accordance with the power comparison result between the in-phase signal and the quadrature signal and the data rate information.

Meanwhile, the preset section of the frame may be positioned next to the Signal field including the data rate information. In the preset section, the power of the in-phase signal is compared with the power of the quadrature signal. Therefore, the preset section may be a section in which the frame format is discriminated in accordance with the power comparison result between the in-phase signal and the quadrature signal. For example, when it is discriminated which standard the frame format corresponds to between the IEEE 802.11a standard and the IEEE 802.11n standard, the preset section may be a section positioned next to the Signal field. That is, this section may be a Data field in the IEEE 802.11a standard or a HT-SIG field in the IEEE 802.11n standard.

Furthermore, the frame format may be determined to be any one of the IEEE 802.11a standard and the IEEE 802.11n standard.

<Frame Format Discrimination Apparatus>

Hereafter, a frame format discrimination apparatus in a wireless communication system in accordance with another embodiment of the present invention will be described.

Figure 9:
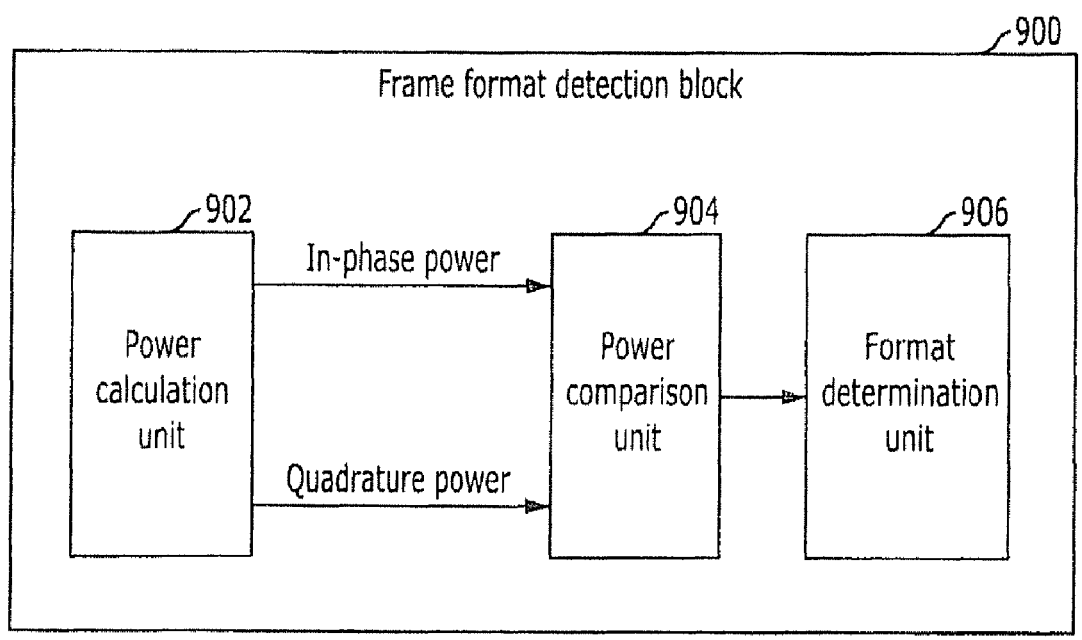
FIG. 9 is a configuration diagram of a frame format discrimination apparatus 900 in accordance with another embodiment of the present invention.

FIG. 9 is a configuration diagram of a frame format discrimination apparatus 900 in accordance with another embodiment of the present invention. Referring to FIG. 9, the frame format discrimination apparatus 900 includes a power calculation unit 902 configured to calculate the powers of an in-phase signal and a quadrature signal in a preset section of a frame, a power comparison unit 904 configured to compare the power of the in-phase signal with the power of the quadrature signal, and a format determination unit 906 configured to determine the format of the frame in accordance with the comparison result.

The power of the in-phase signal may be calculated by summing the powers of in-phase signals for a plurality of subcarriers, and the power of the quadrature signal may be calculated by summing the powers of quadrature signals for the plurality of subcarriers. Meanwhile, the power of the in-phase signal may be calculated by averaging the powers of in-phase signals for a plurality of subcarriers, and the power of the quadrature signal may be calculated by averaging the powers of quadrature signal for the plurality of subcarriers.

When performing the comparison operation, the power comparison unit 904 may reflect a preset weighting factor into the power of the in-phase signal or the quadrature signal.

The frame format discrimination apparatus 900 may further include a data rate check unit configured to check data rate information included in the frame. The data rate check unit is not illustrated in FIG. 9. At this time, the format of the frame may be determined in accordance with the comparison result of the power comparison unit 904 and the checked data rate information. When it is checked that the data rate information indicates a preset data rate, the frame format may be determined in accordance with the comparison result of the power comparison unit 904.

Meanwhile, the preset section of the frame may be positioned next to a signal field including the data rate information. The frame format may be determined to be any one of the IEEE 802.11a standard and the IEEE 802.11n standard.

Other detailed descriptions of the frame format discrimination apparatus 900 are duplicated with those of the above-described frame format discrimination method. Therefore, the duplicated descriptions will be omitted herein.

Specific Embodiments

Hereafter, specific embodiments of the present invention will be described.

Figure 4:
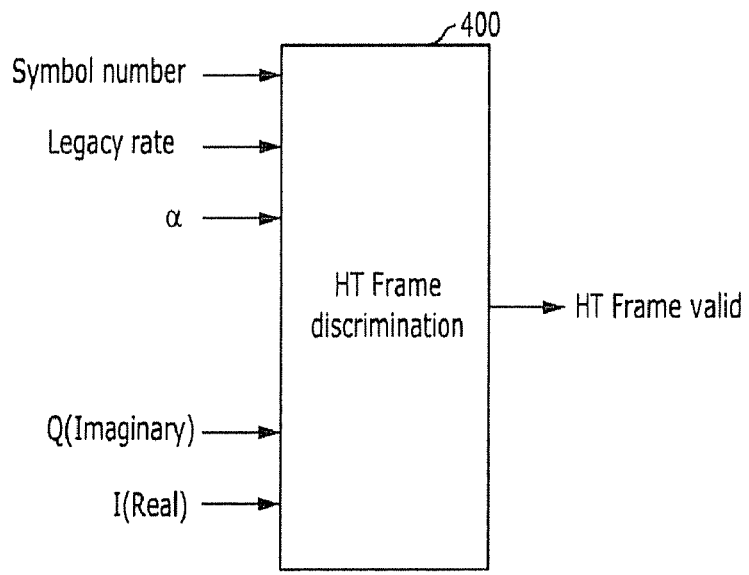
FIG. 4 is a schematic view of a frame format discrimination apparatus 400 in accordance with another embodiment of the present invention.

FIG. 4 is a schematic view of a frame format discrimination apparatus 400 in accordance with another embodiment of the present invention. Referring to FIG. 4, the frame format discrimination apparatus 400 receives a symbol number, a legacy rate, a weight factor α, a quadrature signal Q, and an in-phase signal I, and outputs a frame format discrimination result. Hereafter, the inputs of the frame format discrimination apparatus 400 will be described with reference to FIGS. 5A, 5B, and 6.

Figure 5A:
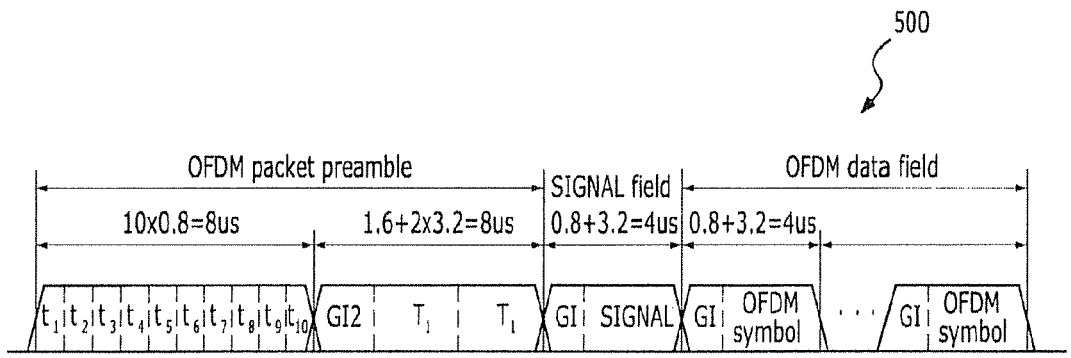
FIG. 5A is a structure diagram of a frame format 500 of the IEEE 802.11a standard.
Figure 5B:
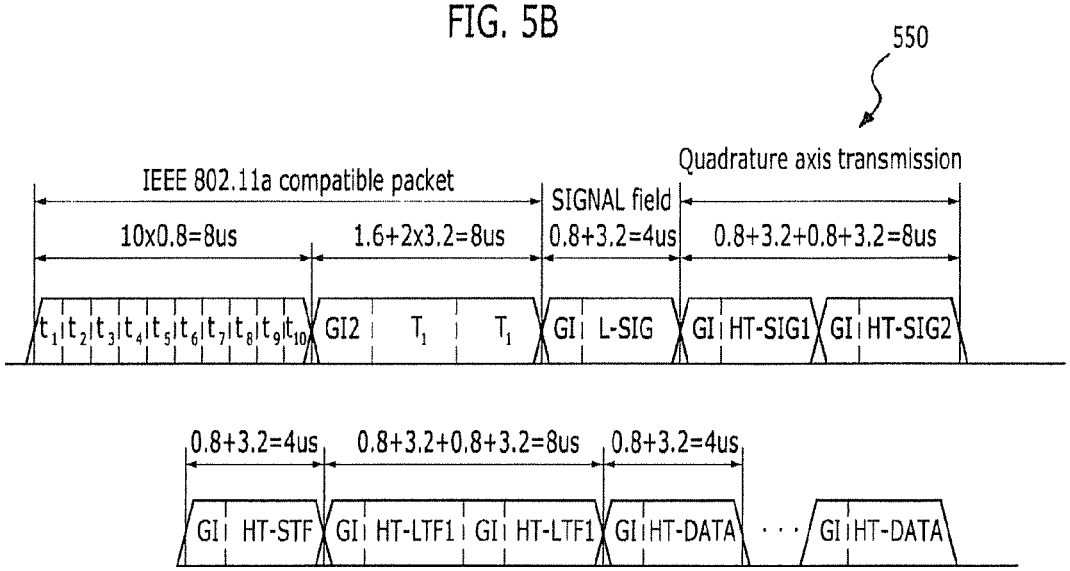
FIG. 5B is a structure diagram of a frame format 550 of the IEEE 802.11n standard.

The symbol number represents a preset section of a frame which is to be used for the frame format discrimination. That is, when the powers of an in-phase signal and a quadrature signal are compared in a preset section of a frame in accordance with the embodiment of the present invention, the symbol number serves to indicate a preset section. Referring to FIGS. 5A and 5B, symbol numbers will be described, which may be applied to the IEEE 802.11a standard and the IEEE 802.11n standard.

FIG. 5A is a structure diagram of a frame format 500 of the IEEE 802.11a standard, and FIG. 5B is a structure diagram of a frame format 550 of the IEEE 802.11n standard. Referring to FIGS. 5A and 5B, the frame format 550 of the IEEE 802.11n standard includes an IEEE 802.11a compatible packet section, in order for the compatibility with the IEEE 802.11a standard. This section is identical to that of the frame format 500 of the IEEE 802.11a standard. To discriminate which standard a frame format corresponds to between the IEEE 802.11a standard and the IEEE 802.11n standard, the powers are compared in a section after 20 us from the head of the frame. That is, in the frame format 500 of the IEEE 802.11a standard, the section becomes a DATA field at which an OFDM symbol is positioned. Furthermore, in the frame format 550 of the IEEE 802.11n standard, a HT-SIG1 or HT-SIG2 field is positioned in the section.

Therefore, the frame format discrimination apparatus 400 may discriminate the preset section by checking the symbol number imparted to each section or symbol of the frame. For example, the symbol number may be imparted as shown in Table 1.

TABLE 1

| Section | Symbol number |
| --- | --- |
| 0 us-8 us | 1 |
| 8 us-16 us | 2 |
| 16 us-20 us | 3 |
| 20 us-24 us | 4 |
| 24 us-28 us | 5 |

Among the inputs of the frame format discrimination apparatus 400, the legacy rate will be now described as follows.

Figure 6:
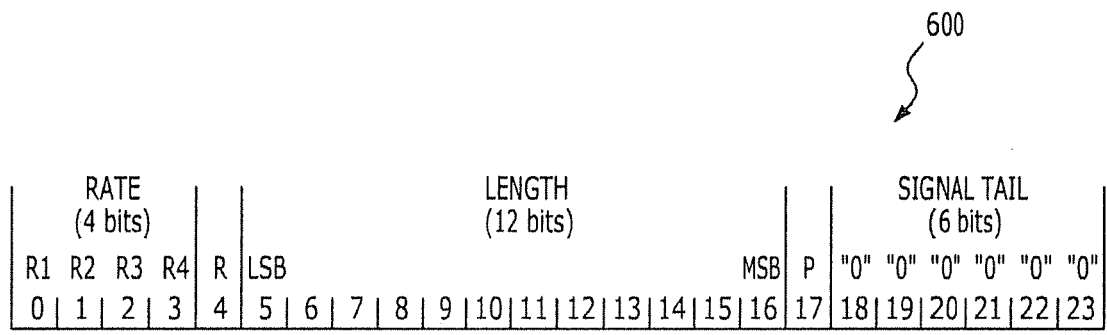
FIG. 6 illustrates the structure of a SIGNAL field of the IEEE 802.11a standard frame format and a Legacy Signal (L-SIG) field of the IEEE 802.11n frame format.

The legacy rate indicates data rate information. Referring to FIGS. 5A and 5B, the legacy rate is information included in a SIGNAL field of the frame format 500 of the IEEE 802.11a standard and a Legacy Signal (L-SIG) field of the frame format 550 of the IEEE 802.11n standard. FIG. 6 illustrates the structure of the SIGNAL field of the IEEE 802.11a standard frame format and the L-SIG field of the IEEE 802.11n frame format. The legacy rate included in four bits corresponding to the head of the SIGNAL field 600 contains information on data rates as shown in Table 2.

TABLE 2

| Rate (Mbits/s) | R1:R4 |
| --- | --- |
| 6 | 1101 |
| 9 | 1111 |
| 12 | 0101 |
| 18 | 0111 |
| 24 | 1001 |
| 36 | 1011 |
| 48 | 0001 |
| 54 | 0011 |

Next, the other inputs of the frame format discrimination apparatus 400 will be described. The weighting factor α may be used for comparing the power of an in-phase signal with the power of a quadrature signal. Q represents a quadrature signal, and I represents an in-phase signal.

Figure 7:
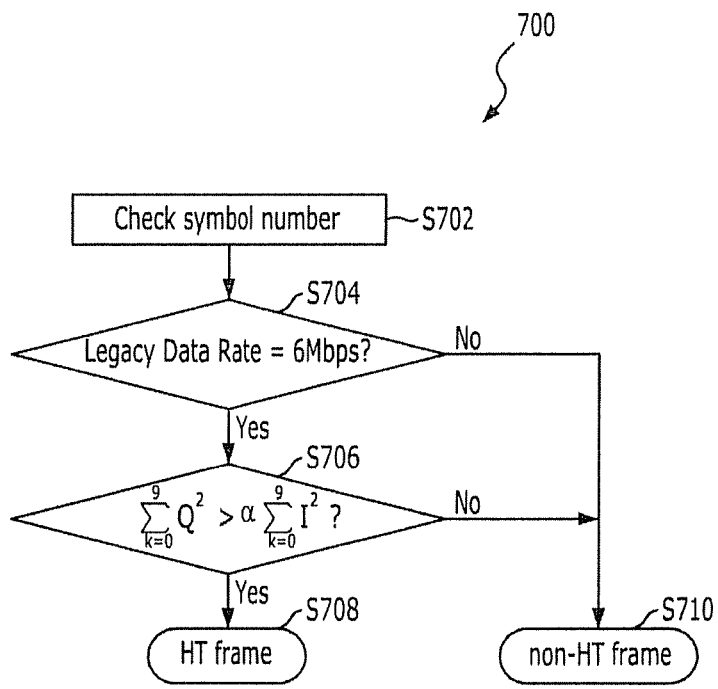
FIG. 7 is a flowchart explaining a frame format discrimination method 700 which is performed by the frame format discrimination apparatus 400.
Figure 8A:
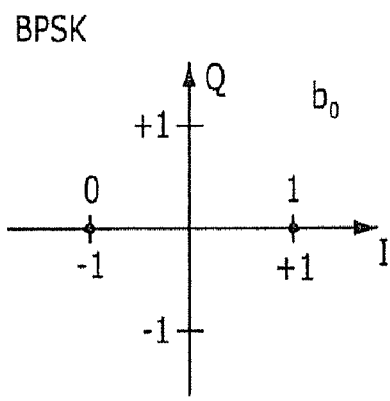
FIG. 8A is a constellation diagram illustrating the BPSK modulation scheme.
Figure 8B:
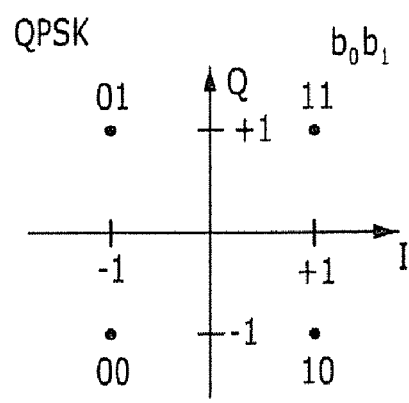
FIG. 8B is a constellation diagram illustrating a Quadrature Phase Shift Key (QPSK) modulation scheme.
Figure 8D:
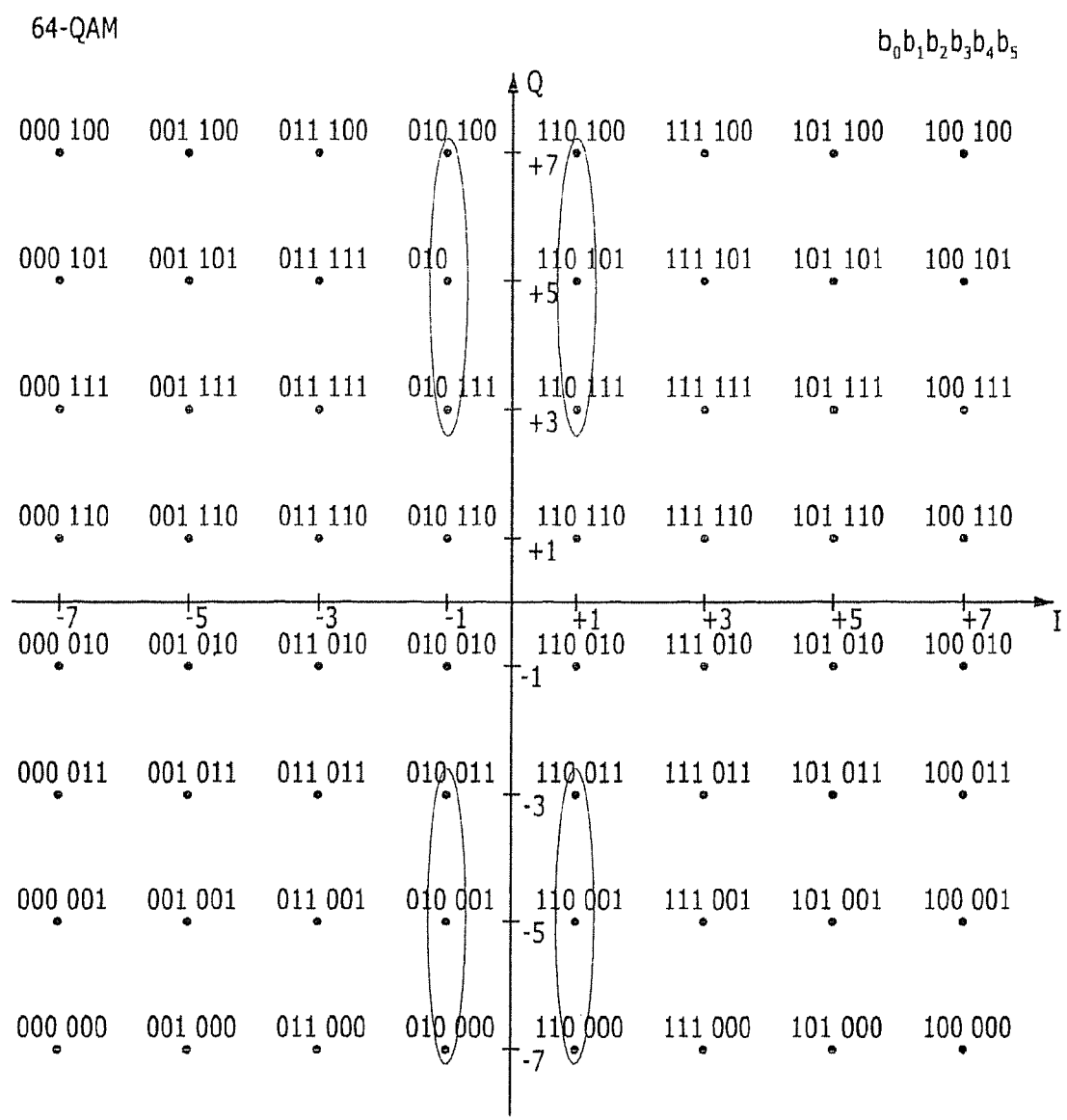
FIG. 8D is a constellation diagram illustrating a 64-QAM scheme.

FIG. 7 is a flowchart explaining a frame format discrimination method 700 which is performed by the frame format discrimination apparatus 400. The frame format discrimination method 700 includes a step S702 of checking a symbol number, a step S704 of checking whether a legacy rate is 6 Mbps or not, and a step S706 of comparing the power of a quadrature signal with the power of an in-phase signal.

First, the frame format discrimination apparatus 400 checks an input symbol number at the step S702. When it is checked that the symbol number is 4 or 5 in a case where symbol numbers are defined as shown in Table 1, the operation proceeds to the next step S704.

Next, the frame format discrimination apparatus 400 checks whether the legacy rate is 6 Mbps or not at the step S704. When it is checked that the legacy rate is not 6 Mbps, the frame is determined to be a non-HT frame at a step S710. When it is checked that the legacy rate is 6 Mbps, the operation proceeds to the next step S706.

At step S706, the powers of the quadrature signal and the in-phase signal are compared in accordance with Equation 1 expressed below.

$$\sum_{subcarriers} Q^2 \underset{Legacy}{\overset{HT}{\gtrless}} \alpha \sum_{subcarriers} I^2, \qquad \text{Eq. 1}$$

In Equation 1, quadrature signals are squared and summed for a plurality of subcarriers, and in-phase signal are squared and summed for the plurality of subcarriers. Then, the weighting factor α is reflected into the addition result to perform the comparison. A subcarrier may be represented by an index k. When Equation 1 is calculated for 10 subcarriers, k may be 0 to 9. The weighting factor α may be set in a different manner depending on channel states or SNR.

When it is determined that the power $$\sum_{subcarriers} Q^2$$

of the quadrature signal is larger than the power $$\alpha \sum_{subcarriers} I^2$$

of the in-phase signal, it is highly likely that the preset section was modulated by the Q-BPSK modulation scheme. Therefore, the frame is determined to be a HT frame at a step S708. Otherwise, the frame is determined to be a non-HT frame at the step S710.

Through such a process, the frame format is finally determined to be the HT frame included in the IEEE 802.11n standard at the step S708 or a non-HT frame included in other standards at the step S710.

Hereafter, the effect of the step S704 of checking the legacy rate will be described with reference to FIGS. 8A to 8D. Even when the step S704 of checking the legacy rate is omitted, the frame format may be determined through the step S706 of comparing the powers. However, when the step S704 of checking the legacy rate is used, it is possible to further increase the precision of the frame format discrimination than when only the step S706 of comparing the powers is used.

As described above, the HT-SIG field of the IEEE 802.11n frame format and the DATA field of the IEEE 802.11a frame format should be discriminate in this embodiment, in order to determine the frame format. At this time, although the HT-SIG field is modulated by the Q-BPSK scheme, the DATA field may be modulated by any one of the BPSK scheme, the QPSK scheme, a 16 Quadrature Amplitude Modulation (16-QAM) scheme, and a 64-QAM scheme. At the step S706, the powers of the quadrature signal and the in-phase signal are compared to discriminate the HT-SIG field modulated by the Q-BPSK scheme. Depending on the modulation scheme of the DATA field, the discrimination of the HT-SIG field may not be performed precisely at the step S706. That is, the precision of the comparison result at the step S706 may decrease in order of the BPSK, QPSK, 16-QAM, and 64-QAM schemes. This will be described in detail with reference to FIGS. 8A to 8D.

FIGS. 8A to 8D are constellation diagrams illustrating the BPSK, QPSK, 16-QAM, and 64-QAM schemes, respectively. Referring to FIGS. 8A to 8D, when the BPSK or QPSK scheme is applied to the DATA field, there is no subcarrier close to the Q axis. Therefore, it is not likely that the DATA field is confused with the HT-SIG field to which the Q-BPSK scheme is applied. In the case of the 16-QAM or 64-QAM scheme, however, the power of the quadrature signal may increase due to subcarriers close to the Q axis, like subcarriers indicated by circles in FIGS. 8C and 8D. In this case, it may be determined at the step S706 that the power of the quadrature signal is larger than the power of the in-phase signal. Furthermore, the DATA field may be mistaken for the HT-SIG field. In this case, the frame may be incorrectly determined to be a HT frame. In particular, a frame received through a wireless channel may have an error in the positions of subcarriers depending on channel states. Accordingly, an error may occur in the frame discrimination. This will be described as follows.

At the step S706, the power of the quadrature signal is compared with the power of the in-phase signal. Then, when the power of the quadrature signal is larger than the power of the in-phase signal, the frame is determined to be a HT frame. Therefore, when a large number of subcarriers among subcarriers included in the DATA field are close to the Q axis, the DATA field may be mistaken for the HT-SIG field. To prevent this, the sum total for the plurality of subcarriers is used as expressed in Equation 1 at the step S706. However, when a large number of subcarriers among the plurality of subcarriers used at this time are close to the Q axis, such an error may occur.

At the step S704, a frame which is not a HT frame is determined accurately depending on the legacy rate. Therefore, it is possible to compensate for a precision loss caused by an error which may occur at the step S706.

In accordance with the embodiments of the present invention, it is possible to discriminate the format of a frame with high precision in a wireless communication system.

The above-described method in accordance with the embodiment of the present invention may be stored in computer-readable recording media or data storage media and may be read out and executed by the computers. Examples of the computer-readable recording media include CD-ROM, RAM, ROM, floppy disks, hard disks, and magneto-optical disks. Since such a process may be easily construed by those skilled in the art to which the invention pertains, the descriptions thereof will be omitted herein.

While the present invention has been described with respect to the specific embodiments, it will be apparent to those skilled in the art that various changes and modifications may be made without departing from the spirit and scope of the invention as defined in the following claims.

What is claimed is:

1. A method for discriminating a frame format in a wireless communication system, comprising:
    calculating a power of an in-phase signal and a power of a quadrature signal in a predetermined section of a frame;
    comparing the power of the in-phase signal with the power of the quadrature signal; and
    determining the format of the frame in accordance with the comparison result.

2. The format discrimination method of claim 1, wherein the power of the in-phase signal is calculated by summing the powers of in-phase signals for a plurality of subcarriers, and the power of the quadrature signal is calculated by summing the powers of quadrature signals for the plurality of subcarriers.

3. The method of claim 1, wherein the power of the in-phase signal is calculated by averaging the powers of in-phase signals for a plurality of subcarriers, and the power of the quadrature signal is calculated by averaging the powers of quadrature signals for the plurality of subcarriers.

4. The method of claim 1, wherein the comparison of the powers is performed by reflecting a predetermined weighting factor into the power of the in-phase signal or the power of the quadrature signal.

5. The method of claim 1, further comprising:
checking data rate information included in the frame,
wherein the format of the frame is determined in accordance with the comparison result and the data rate information.

6. The method of claim 5, wherein, when it is checked that the data rate information indicates a preset data rate, the format of the frame is determined in accordance with the comparison result.

7. The method of claim 1, wherein the preset section is positioned next to a signal field including data rate information.

8. The method of claim 1, wherein the format of the frame is determined to be any one of the IEEE 802.11a standard and the IEEE 802.11n standard.

9. An apparatus for discriminating a frame format in a wireless communication system, comprising:
a power calculation unit configured to calculate a power of an in-phase signal and a power of a quadrature signal in a predetermined section of a frame;
a power comparison unit configured to compare the power of the in-phase signal with the power of the quadrature signal; and
a format determination unit configured to determine the format of the frame in accordance with the comparison result.

10. The apparatus of claim 9, wherein the power of the in-phase signal is calculated by summing the powers of in-phase signals for a plurality of subcarriers, and the power of the quadrature signal is calculated by summing the powers of quadrature signals for the plurality of subcarriers.

11. The apparatus of claim 9, wherein the power of the in-phase signal is calculated by averaging the powers of in-phase signals for a plurality of subcarriers, and the power of the quadrature signal is calculated by averaging the powers of quadrature signals for the plurality of subcarriers.

12. The apparatus of claim 9, wherein the power comparison unit performs the comparison by reflecting a predetermined weighting factor into the power of the in-phase signal or the quadrature signal.

13. The apparatus of claim 9, further comprising:
a data rate check unit configured to check data rate information included in the frame,
wherein the format of the frame is determined in accordance with the comparison result and the data rate information.

14. The apparatus of claim 13, wherein when it is checked that the data rate information indicates a predetermined data rate, the format of the frame is determined in accordance with the comparison result.

15. The method of claim 9, wherein the preset section is positioned next to a signal field including data rate information.

16. The method of claim 9, wherein the format of the frame is determined to be any one of the Institute of Electrical and Electronic Engineers (IEEE) 802.11a standard and the IEEE 802.11n standard.

* * * * *